United States Patent
Franzén et al.

(10) Patent No.: US 7,052,529 B2
(45) Date of Patent: May 30, 2006

(54) METHOD AND A DEVICE FOR CLEANING OF CRANKCASE GASES COMING FROM AN INTERNAL COMBUSTION ENGINE ADAPTED FOR PROPELLING A MEANS OF TRANSPORTATION

(75) Inventors: Peter Franzén, Tullinge (SE); Ingvar Hällgren, Tumba (SE); Leif Larsson, Tumba (SE)

(73) Assignee: Alfa Laval Corporate AB, Lund (SE)

( * ) Notice: Subject to any disclaimer, the term of this patent is extended or adjusted under 35 U.S.C. 154(b) by 174 days.

(21) Appl. No.: 10/433,223

(22) PCT Filed: Oct. 31, 2001

(86) PCT No.: PCT/SE01/02394

§ 371 (c)(1),
(2), (4) Date: Sep. 19, 2003

(87) PCT Pub. No.: WO02/44530

PCT Pub. Date: Jun. 6, 2002

(65) Prior Publication Data

US 2004/0040442 A1  Mar. 4, 2004

(30) Foreign Application Priority Data

Dec. 1, 2000  (SE) .................................. 0004459

(51) Int. Cl.
*B01D 45/14* (2006.01)

(52) U.S. Cl. .................... 95/270; 55/406; 55/DIG. 19; 123/198 E; 60/311

(58) Field of Classification Search .................. 55/400, 55/406, 408, 409, DIG. 19; 123/198 E
See application file for complete search history.

(56) References Cited

U.S. PATENT DOCUMENTS 5,779,618 A * 7/1998 Onodera et al. ............... 494/5
2004/0159085 A1 * 8/2004 Carlsson et al. .............. 55/406

FOREIGN PATENT DOCUMENTS

WO    WO 99/56883    11/1999

\* cited by examiner

*Primary Examiner*—Robert A. Hopkins
(74) *Attorney, Agent, or Firm*—Michaud-Duffy Group LLP (57) ABSTRACT

In a vehicle adapted to be propelled by means of an internal combustion engine crankcase gases coming from the combustion engine are cleaned by means of a centrifugal separator. The rotor of the centrifugal separator is driven by means of pressurized air delivered by a compressor, e.g. a so called turbo compressor, which is driven by means of the combustion engine. During periods when the compressor delivers pressurized air in an insufficient amount and/or at insufficient pressure the rotor of the centrifugal separator is instead driven by means of pressurized air coming from a container containing so called auxiliary pressurized air. The auxiliary pressurized air may have a substantially larger pressure than the pressurized air normally delivered by the compressor. The combustion engine is used also for accomplishing the overpressure of the auxiliary pressurized air in the container.

16 Claims, 5 Drawing Sheets

METHOD AND A DEVICE FOR CLEANING OF CRANKCASE GASES COMING FROM AN INTERNAL COMBUSTION ENGINE ADAPTED FOR PROPELLING A MEANS OF TRANSPORTATION

CROSS-REFERENCE TO RELATED APPLICATIONS

This application is entitled to the benefit of and incorporates by reference essential subject matter disclosed in International Patent Application No. PCT/SE01/02394 filed on Oct. 31, 2001 and Swedish Patent Application No. 0004459-4 filed on Dec. 1, 2000.

FILED OF THE INVENTION

The present invention primarily relates to a method of cleaning crankcase gases coming from an internal combustion engine, that is adapted for propelling a means of transportation, e.g. a car or a vessel, in the following named a vehicle. More closely the invention relates to a method of this kind, in which a centrifugal rotor is used for the cleaning, driven by means of pressurized air delivered from a compressor which, in turn, is driven by means of the combustion engine, e.g. an exhaust gas driven compressor—often named turbo compressor—adapted for generation and supply of pressurized air to the combustion room of the motor.

BACKGROUND OF THE INVENTION

Cleaning of crankcase gases by means of a centrifugal rotor driven by means of a compressor of this kind is suggested in WO 99/56883.

Cleaning of crankcase gases in the way proposed in WO 99/56883 advantageously may be performed in connection with an internal combustion engine that is driven substantially at an unchanged speed during the main part of its operation, e.g. a combustion engine adapted for driving a power plant for generation of electric current. However, the cleaning method is not suitable in connection with a combustion engine that is adapted for propelling of a vehicle, since cleaning performed in this way would be heavily reduced or completely fail to take place during periods when the vehicle stands still but the combustion engine is idling or when the vehicle is moving without being propelled by means of the combustion engine.

The object of the present invention is to improve the proposed method of cleaning of crankcase gases, so that it can be used in practice even in connection with a combustion engine adapted for propelling of a vehicle.

SUMMARY OF THE INVENTION

This object can be obtained in a way such that the centrifugal rotor, during periods when said compressor delivers pressurized air in an insufficient amount and/or at insufficient pressure, is driven by means of pressurized air coming from a container containing auxiliary pressurized air, the combustion engine being used also for accomplishing the pressure of the auxiliary pressurized air in said container. A container of this kind often is present already on a vehicle and contains auxiliary pressurized air intended for instance for the braking system of the vehicle and/or for other purposes. A particular compressor, other than the aforementioned exhaused gas driven so called turbo compressor, normally is adapted for securing that such auxiliary pressurized air is always available in said container for use for instance in the braking system of the vehicle.

The invention can be used in connection with any suitable driving system for the centrifugal rotor, using pressurized air as a driving medium. For instance, the invention may be used in connection with a driving system including a gas turbine of one kind or another. WO 99/56882 and WO 99/56883 describe a driving system of this kind, in which the centrifugal rotor is driven by means of pressurized air supplied centrally to the centrifugal rotor and being discharged therefrom through one or more tangentially directed nozzles arranged at some distance from the rotational axis of the centrifugal rotor. In a different driving system, in which the invention may be used, the pressurized air from said compressor is caused to flow through a stationary nozzle towards a ring of turbine blades which are drivably connected with the centrifugal rotor.

Even if it would be possible to utilize a first kind of driving system for driving of the centrifugal rotor by means of pressurized air from said compressor and a different kind of driving system for driving of the centrifugal rotor by means of pressurized air from said container, the present invention suggests utilization of the same kind of driving system for pressurized air coming from said compressor as well as pressurized air coming from said container. If a ring of turbine blades is used, which are drivably connected with the centrifugal rotor, the same turbine blades may be used both for operation with pressurized air from the compressor and for operation with pressurized air from the container.

Upon use of a driving system with a stationary nozzle one and the same stationary nozzle may be used, if desired, for both said flows of pressurized air, but alternatively different nozzles may be used for the respective flows. If the pressure of the auxiliary pressurized air in said container is substantially larger than the pressure of the pressurized air delivered from said compressor at normal centrifugal operation, the flow of pressurized air from the container—if a common nozzle is used—has to be throttled before it arrives at the nozzle. In the case a separate nozzle is used for the auxiliary pressurized air, this nozzle itself may be adapted to provide a desired throttling, so that the centrifugal rotor is actuated by a driving force of substantially the same magnitude both from pressurized air coming from the container and from pressurized air coming from the compressor. Depending upon the current need of cleaning efficiency of the centrifugal rotor the throttling, of course, may alternatively be dimensioned so that the driving force becomes either smaller or larger from pressurized air coming from the container than from pressurized air coming from the compressor.

The pressure of pressurized air delivered by a so called turbo compressor on a motor vehicle may be in the area of 0.5–2 bars, whereas the pressure in a container with pressurized air intending for the braking system of a motor vehicle may be in the area of 8–12 bars.

The present invention also concerns a particular cleaning device for performing the method described above for cleaning of crankcase gases. A cleaning device of this kind includes a centrifugal rotor, that is rotatable about a rotational axis and adapted for cleaning of a flow of crankcase gases, a ring of turbine blades adapted to be drivably connected with the centrifugal rotor and a stationary driving fluid nozzle adapted to receive from a driving fluid conduit pressurized air having a pressure of a certain order of magnitude and to direct a flow of this pressurized air towards the ring of turbine blades for rotation of the centrifugal rotor.

The cleaning device according to the invention is characterized by a valve means connectable to an auxiliary fluid conduit, that is adapted to receive auxiliary pressurized air having preferably a pressure larger than said pressure of a certain order of magnitude. Furthermore, the cleaning device is characterised in that said valve means forms or is connectable to an auxiliary fluid channel adapted to communicate either with said driving fluid nozzle or with an auxiliary fluid nozzle which, like the driving fluid nozzle, is adapted to direct a flow of auxiliary pressurized air towards the ring of turbine blades for rotation of the centrifugal rotor, and that the valve means further is adapted to prevent or admit that auxiliary pressurized air is conducted from the auxiliary fluid conduit to the auxiliary fluid channel.

If the auxiliary pressurized air has a pressure higher than said pressure of a certain order of magnitude, a throttling member other than said driving fluid nozzle is preferably adapted to throttle a flow of auxiliary pressurized air, when auxiliary pressurized air is admitted to flow through the valve Means.

If said driving fluid nozzle is to be used also for the driving of the centrifugal rotor by means of auxiliary pressurized air, said auxiliary fluid channel has to be connectable, of course, to the driving fluid nozzle. Then, said throttling member may be arranged either in the auxiliary fluid channel or upstream thereof, e.g. in said auxiliary fluid conduit. Alternatively, the throttling member may be formed by the valve means itself.

However, according to a preferred embodiment of the invention the auxiliary fluid channel communicates, instead, with a special auxiliary fluid nozzle. Then, said throttling member may be formed by the auxiliary fluid nozzle itself. This is particularly advantageous if the auxiliary pressurized air has a pressure exceeding about 2 bars, for in such a case the energy of the auxiliary pressurized air may be used in a very efficient way by use of a so called De Laval-nozzle as an auxiliary fluid nozzle. By means of a nozzle of this kind the auxiliary pressurized air may be brought to a speed exceeding the speed of sound, which creates possibilities for an efficient driving of the centrifugal rotor with a high rotational speed—resulting in an efficient cleaning of the crankcase gases—even by means of the auxiliary pressurized air.

Within the scope of the invention the transfer from operation of the centrifugal rotor by means of pressurized air coming directly from said compressor to operation by means of auxiliary pressurized air coming from said container may be initiated and completed in any suitable way. For instance, a sensing means of some kind may be adapted to sense when the rotational speed of the compressor is decreasing below a predetermined value, or a pressure sensor may be used to sense when the pressure of the pressurized air from the compressor drops below a predetermined value, and in response to sensing of this kind a valve may be adjusted for letting through auxiliary pressurized air for driving of the centrifugal rotor.

Alternatively, a sensing means may sense some parameter that is only indirectly influenced when the compressor provides, or soon will provide, insufficient air pressure for driving of the centrifugal rotor.

When auxiliary pressurized air is used for operation of the centrifugal rotor, it is not necessary to interrupt the connection between said driving fluid conduit and the driving fluid nozzle. In the case a common nozzle is used for pressurized air of both kinds, however, a check valve may be needed in the driving fluid conduit for preventing auxiliary pressurized air having an increased pressure from flowing in the wrong direction therein.

If desired, a valve means may be used which is adapted both to connect the auxiliary fluid conduit to the auxiliary fluid channel and to dose the connection between the ordinary driving fluid conduit and the driving fluid nozzle.

A particularly simple and inexpensive use of the invention can be obtained if
  the valve means includes a valve member movable between two positions, the valve member being adapted in a first position to prevent and in a second position to admit that auxiliary pressurized air is conducted from the auxiliary fluid conduit to the auxiliary fluid channel,
  said valve member is adapted, for taking said first position, to be actuated by an air pressure prevailing in said driving fluid conduit and, for taking of said second position, to be actuated by an air pressure prevailing in said auxiliary fluid conduit, and
  the valve member further has a first pressure surface exposed to the pressure in said driving fluid conduit and a second pressure surface exposed to the pressure in said auxiliary fluid conduit, said first pressure surface being larger than said second pressure surface.

Provided that said two pressure surfaces are correctly dimensioned, with respect to the pressures of the two kinds of pressurized air, a valve means of this kind will automatically accomplish operation of the centrifugal rotor by means of auxiliary pressurized air from said container, when the compressor temporarily does not deliver pressurized air having an overpressure required for operation of the centrifugal rotor.

If desired, a valve body having the function described above may alternatively be actuated also, or only, by one or more mechanical springs or hydraulically.

BRIEF DESCRIPTION OF THE DRAWINGS

A preferred embodiment of the device according to the invention is described in the following with reference to the accompanying drawing, in which FIG. 4 shows a section taken along the line IV—IV in FIG. 2, the FIGS. 4a and 4b showing parts of FIG. 2 in an enlarged scale.

DETAILED DESCRIPTION OF THE PREFERRED EMBODIMENTS

Figure 1:
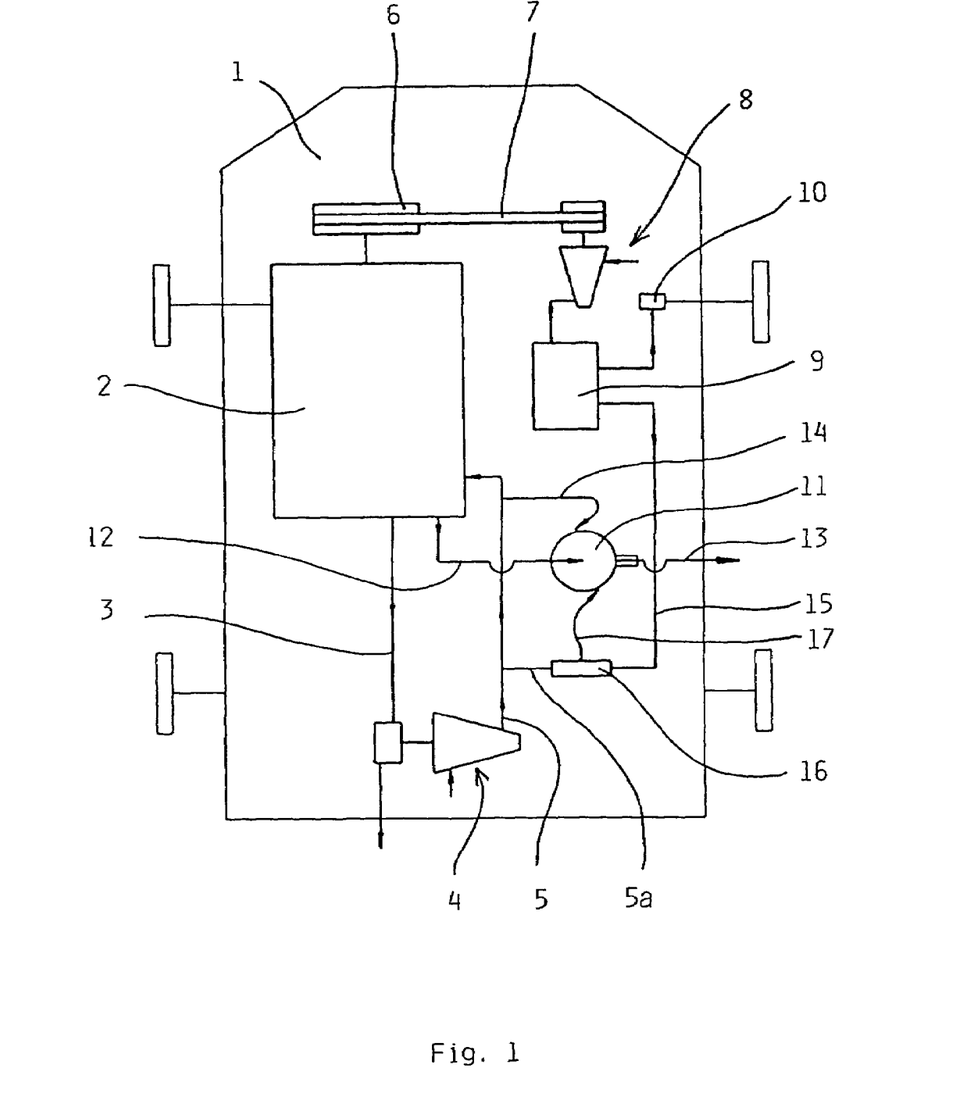
FIG. 1 shows a schematical picture of a vehicle that is adapted to be driven by means of an internal combustion engine and is equipped with a cleaning device according to the invention for cleaning of crankcase gases coming from the combustion engine.

FIG. 1 shows schematically a vehicle 1, that is adapted to be propelled by means of an internal combustion engine 2. An exhaust pipe 3 is adapted to conduct away exhaust gases from the motor 2 via a so called turbo compressor 4. Compressed air is conducted from the turbo compressor 4 through a conduit 5 to the motor 2, in which it is supplied into the combustion room thereof (not shown). Upon propelling of the vehicle 1 the exhaust gases of the motor 2 accomplish that the turbo compressor generates an overpressure, normally in the order of 0.5–2 bars, in the conduit 5.

Through a belt disc 6 and a belt 7 the motor 2 is adapted to drive also a compressor 8 for delivering pressurized air to a container 9. The pressure in this container is maintained at a pressure in the order of 8–12 bars, i.e. a pressure substantially larger than the pressure accomplished by the turbo compressor 4 in the conduit 5. From the container 9 pressurized air, upon need, is conducted to the braking system 10 of the vehicle.

The vehicle 1 carries also a cleaning device for cleaning of crankcase gases coming from the combustion engine 2. This cleaning device includes a centrifugal separator 11, a conduit 12 adapted to conduct the crankcase gases from the motor 2 to the centrifugal separator 11 and a conduit 13 adapted to conduct cleaned crankcase gases away from the centrifugal separator.

For the operation of the centrifugal separator there is a gas turbine which can be charged with driving pressurized air either from the turbo compressor 4, through the conduit 5 and a branch conduit 14 therefrom, or from the container 9 through a first conduit 15, a valve device 16 and a second conduit 17. The valve device 16 communicates through a conduit 5a also with the conduit 5. In the following the conduit 5 will be named the driving fluid conduit and the conduit 15 will be named the auxiliary fluid conduit. Furthermore, the interior of the conduit 17 will be named the auxiliary fluid channel.

The cleaning device will be described more in detail with reference to the FIGS. 2–7.

Figure 2:
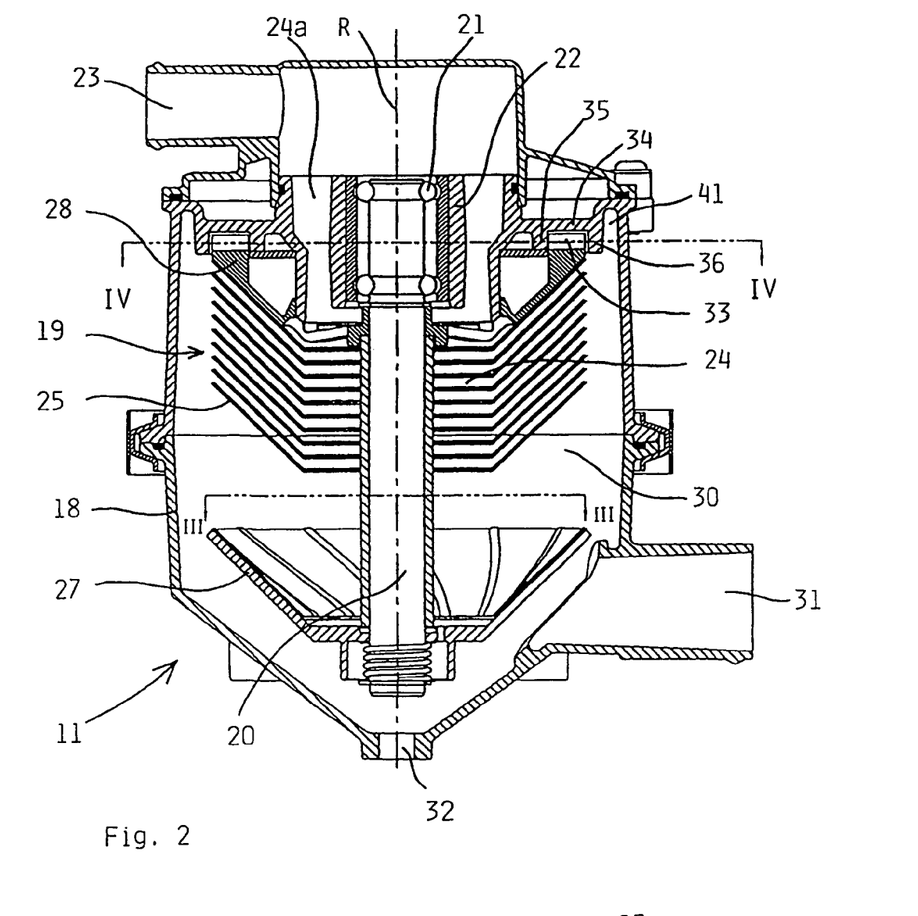
FIG. 2 shows a longitudinal sectional view through a centrifugal separator forming part of the cleaning device according to the invention.
Figure 3:
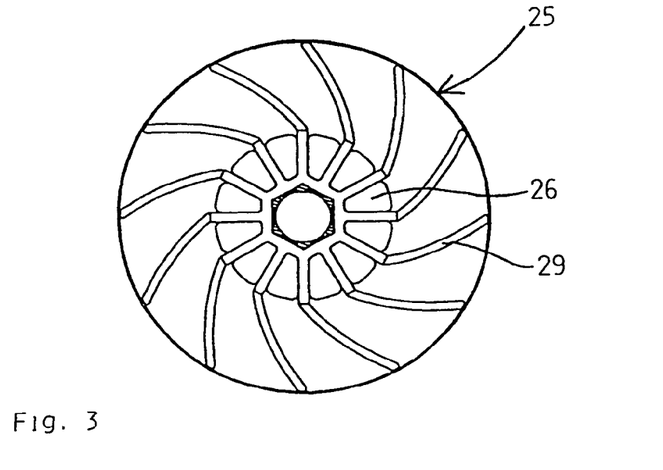
FIG. 3 shows a view seen from the line III–IV in FIG. 2.

The centrifugal separator includes a stationary housing 18 and a rotor 19 rotatable therein about a vertical rotational axis R. The rotor 19 has a central shaft 20 that is journalled by means of bearings 21 in a sleeve 22 supported by an upper part of the casing 18.

At the top the housing has an inlet 23 for crankcase gases to be cleaned and entering through the conduit 12 from the combustion engine 2 (see FIG. 1). The inlet 23 communicates with a central space 24 in the rotor 19 through several passages 24a distributed around said sleeve 22. The central space 24 is formed by central parts of interspaces between a large number of partly conical separation discs 25, stacked upon each other, and by several through openings 26 (see FIG. 3) formed in central plane portions of the separation discs 25. FIG. 2 shows only part of the stacked separation discs 25.

At the bottom the centrifugal rotor 19 has an end wall 27 and at the top an end wall 28, between which end walls the separation discs 25 are thus stacked. On their sides facing upwards the separation discs have spacing members in the form of ribs 29 (see FIG. 3), so that interspaces are formed between adjacent separation discs. Through these interspaces the central space 24 of the rotor communicates with a chamber 30, which surrounds the rotor 19 in the casing 18.

The casing 18 has an outlet 31 for cleaned crankcase gases and a bottom outlet 32 for contaminants having been separated from the crankcase gases.

On its upper side the upper rotor end wall 28, along its radially outer periphery edge, has a ring of turbine blades 33. These blades are arranged in a downwardly open groove that is formed by a partition 34 of the stationary casing 18. The groove is delimited sidewise by two annular, downwardly directed flanges 35 and 36 formed on the underside of the partition 34.

Figures 4, 4A, 4B:
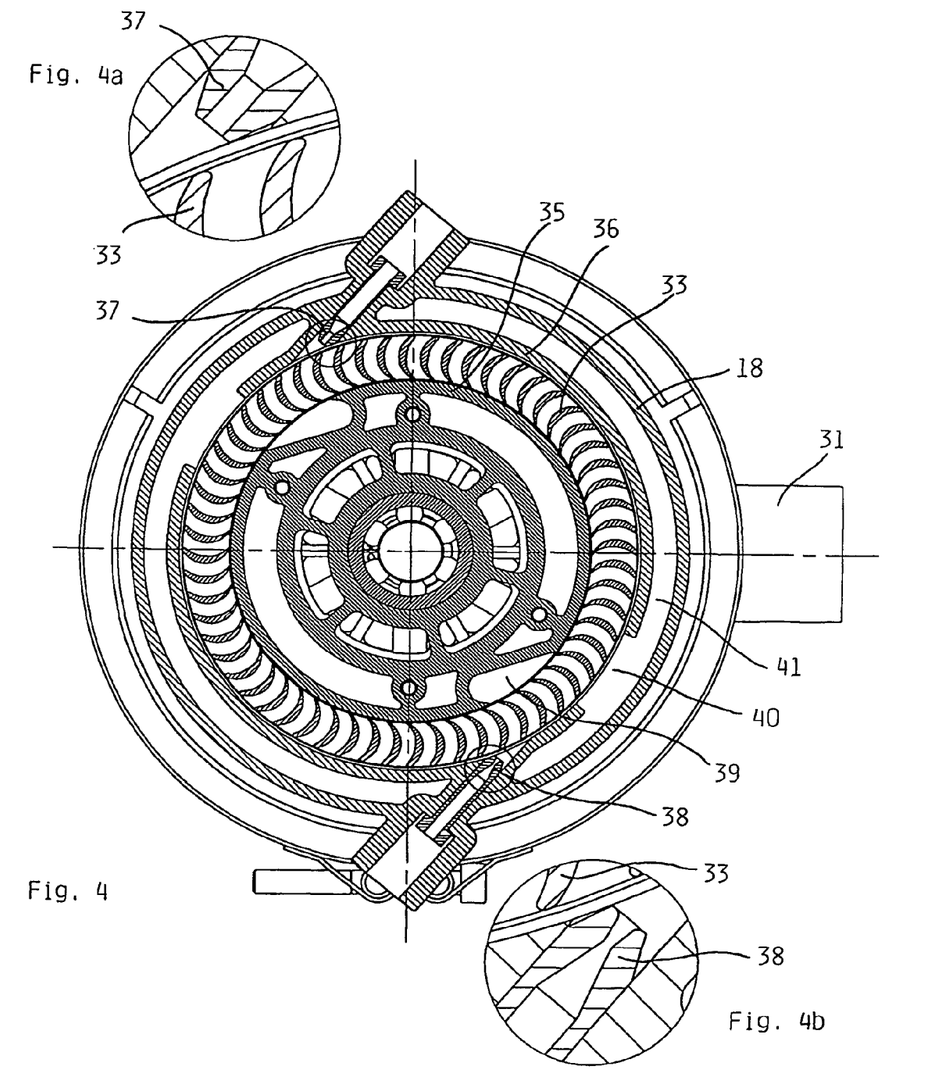

The turbine blades 33 as well as the flanges 35 and 36 are shown also in FIG. 4, from which it can also be seen that the casing 18 supports two stationary nozzles 37 and 38 placed diametrically on opposite sides of the rotational axis of the centrifugal rotor. Each one of the nozzles 37, 38 is adapted to direct a flow of pressurized air towards the ring of turbine blades 33 in a way such that the centrifugal rotor 18 is brought into rotation about its rotational axis R.

Radially inside the ring of turbine blades 33 the casing 18 forms a so called reversing chamber 39, into which a flow of pressurized air having flowed through the interspaces between a number of turbine blades 33 may be brought to change direction and flow through the blade interspaces anew in order to give the centrifugal rotor further driving force. Through an opening 40 in the annular flange 36 the pressurized air finally enters an annular space 41, which communicates with the aforementioned chamber 30 surrounding the centrifugal rotor in the casing 18 (see FIG. 2).

As can be seen from the FIGS. 4a and 4b, the nozzles 37 and 38 are somewhat different. The nozzle 37 is somewhat wider than the nozzle 38, and the reason therefore is that the nozzle 37 is intended to be used when the centrifugal rotor is to be driven by means of pressurized air having a relatively small overpressure, e.g. between 0.5 and 2 bars, whereas the nozzle 38 is intended to be used when the centrifugal rotor is to be driven by means of pressurized air having a relatively large overpressure, e.g. between 8 and 12 bars. The nozzle 38 is a De Laval-nozzle.

Figure 5:
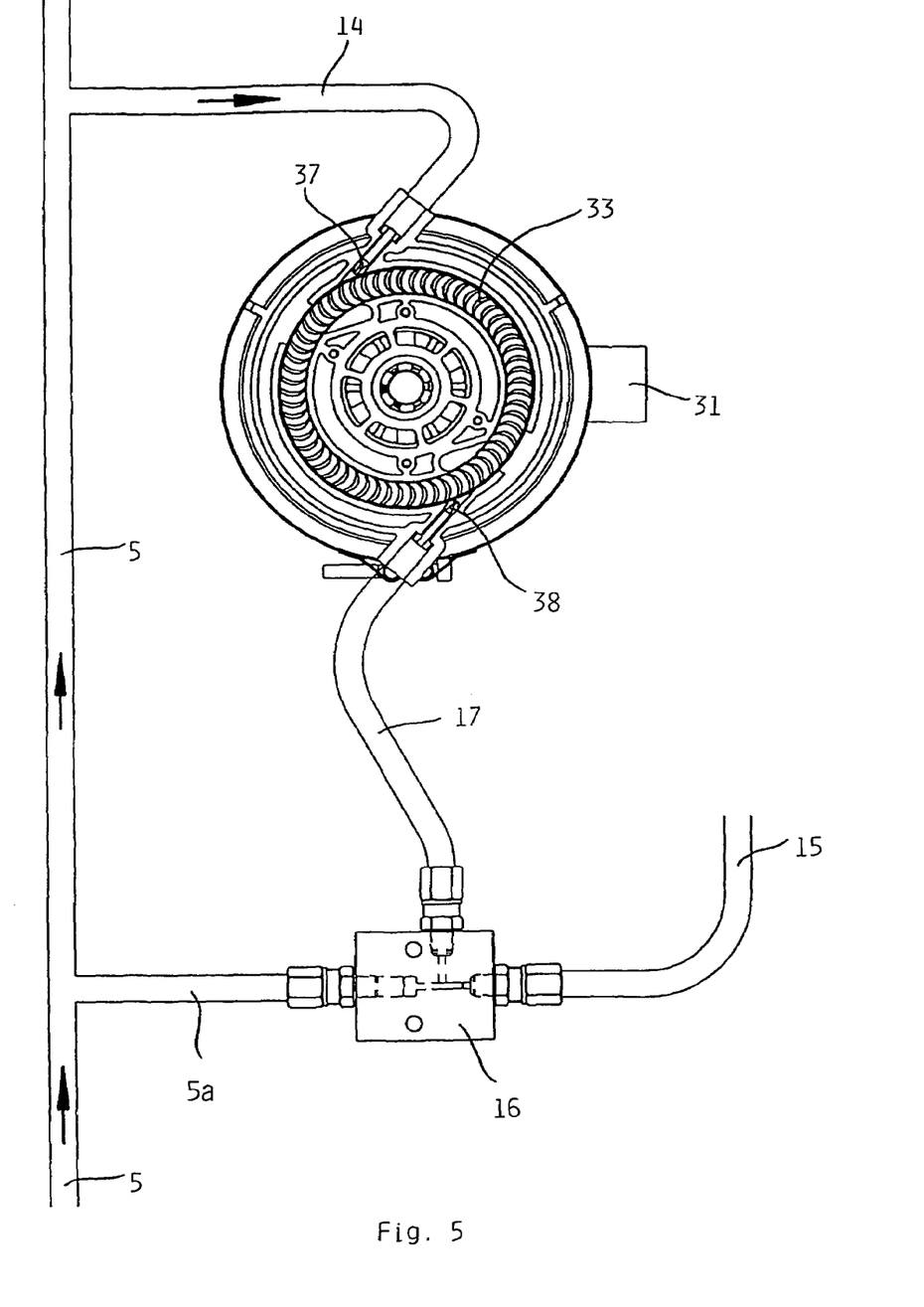
FIG. 5 shows a part of a driving means for driving the centrifugal separator according to the FIGS. 2–4.

FIG. 5 shows substantially the same section of the centrifugal separator as FIG. 4 and makes evident how the nozzles 37 and 38 communicate with the various pressurized air conduits shown in FIG. 1. Thus, the nozzle 37 communicates through the branch conduit 14 with the driving fluid conduit 5, which is adapted to receive pressurized air from the turbo compressor 4. The nozzle 38 communicates with the auxiliary fluid channel of the conduit 17, which is adapted to be put into communication with the auxiliary fluid conduit 15 through the valve device 16. The auxiliary fluid conduit 15 is adapted to receive pressurized air from the pressurized air container 9.

Figure 6:
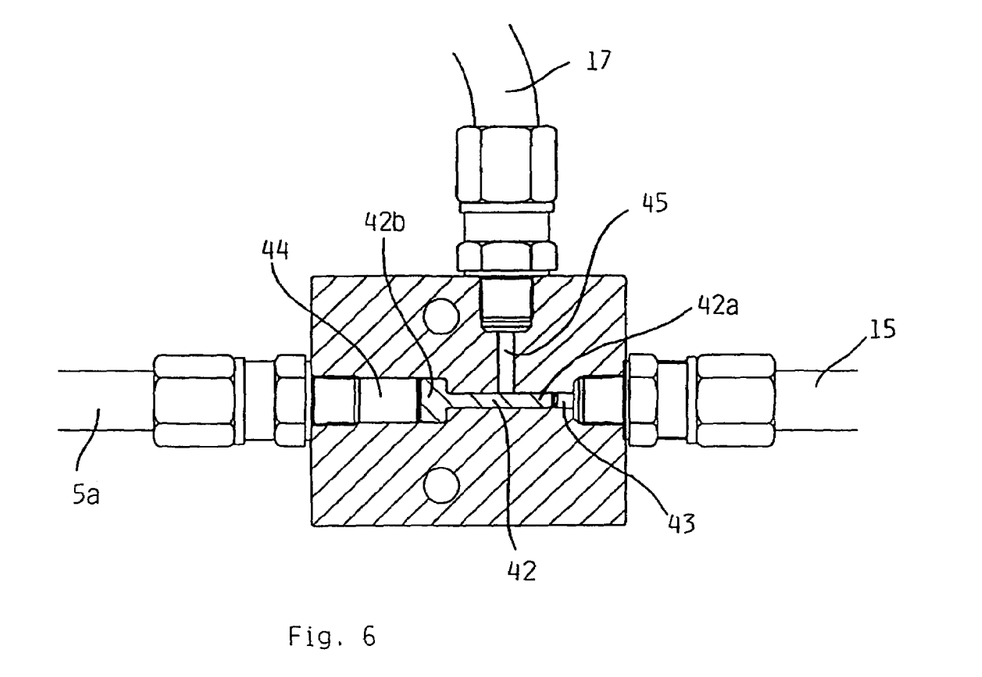
FIG. 6 shows a valve means forming a part of the driving means according to FIG. 5.

FIG. 6 shows the valve device 16 in detail. Thus, it can be seen that the valve device has a space, in which a valve member 42 is movable between two end positions. The valve member 42, dividing said space into two chambers 43 and 44, has a relatively narrow part 42a fitting in a correspondingly narrow portion of said space and exposing a relatively small pressure surface towards the chamber 43, and a relatively thick part 42b fitting in a correspondingly thick portion of said space and exposing a relatively large pressure surface towards, the chamber 44.

The auxiliary fluid conduit 15 is connected with the valve device 16 so that its interior communicates with the chamber 43, whereas the conduit 5a, that communicates with the driving fluid conduit 5 (see FIG. 5), is connected with the valve device 16 so that its interior communicates with the chamber 44. The relatively small pressure surface of the valve member 42, thus, will be actuated by the pressure in the conduit 15, i.e. the pressure in the aforementioned container 9, whereas the relatively large pressure surface of the valve member will be actuated by the pressure in the conduit 5a, i.e. the pressure generated by the turbo compressor 4.

The sizes of said pressure surfaces of the valve member 42 are chosen—with respect to, on the one hand, the substantially constant pressure intended to prevail in the conduit 15 and, on the other hand, the pressure to be generated by the turbo compressor in the conduit 5a during normal driving of the vehicle 2—so that the valve member 42 during normal driving of the vehicle 2 will be pressed towards its end position shown in FIG. 6, i.e. to the right with respect to FIG. 6. If the pressure in the conduit 5a and thus in the chamber 44 drops below a predetermined value, the force by which the valve member 42 is influenced by the pressure in the auxiliary fluid conduit 15, and thus in the chamber 43, will overwin the force by which the valve member 42 is actuated by the pressure in the chamber 44. Then, the valve member will be moved to its opposite end position, i.e. to the left with reference to FIG. 6.

The valve device 16 also forms a passage 45, one end of which communicates with the auxiliary fluid channel in the conduit 17, which is also connected to the valve device 16, and the other end of which communicates with the aforementioned space in the valve device 16. The position of the connection between the passage 45 and said space is chosen in a way such that the opening of the passage 45 in said space is covered by the valve member 42, when this is situated in its right end position with reference to FIG. 6, i.e. when the turbo compressor delivers pressurized air in a sufficient amount and at sufficient pressure for operation of the centrifugal separator 11. In this position of the valve member 42, thus, there is no connection between the passage 45 and the chamber 43, which communicates with the auxiliary fluid conduit 15.

Figure 7:
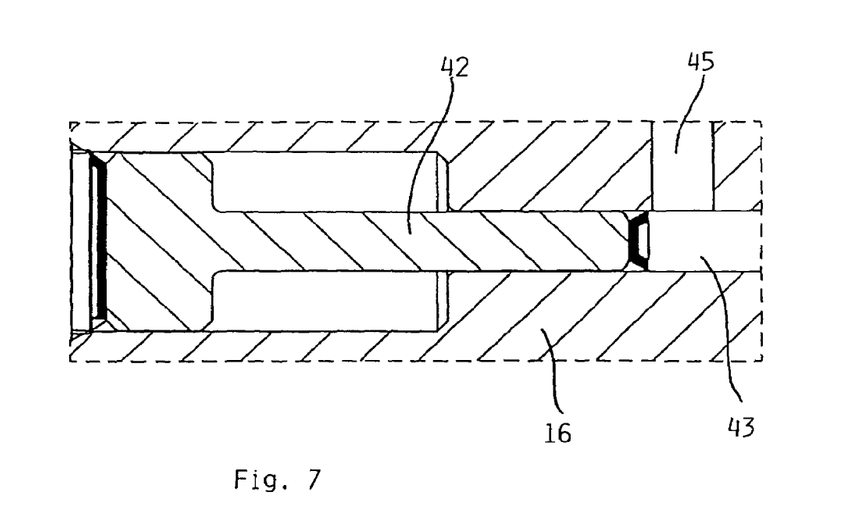
FIG. 7 shows a part of the valve means according to FIG. 6 in an enlarged scale.

FIG. 7 shows in a somewhat larger scale part of the valve device 16. From this it can be seen a situation, in which the valve member 42 is situated at its opposite end position, i.e. when the pressure in the conduit 5a has dropped below a predetermined value and the pressure in the auxiliary fluid conduit 15 therefore has pressed the valve member to the left with reference to FIGS. 6 and 7. In this situation communication prevails between the passage 45 and the chamber 43, so that pressurized air having a relatively high pressure may pass from the auxiliary fluid conduit 15 through the valve device 16 to the auxiliary fluid channel in the conduit 17.

The cleaning device described above operates in the following manner.

When the vehicle 1 is propelled by the combustion engine 2, the turbo compressor 4 creates an air pressure in the conduit 5 and the branch conduits 5a and 14 in the order of 0.5–2 bars. Simultaneously, the motor 2 drives the compressor 18 delivering pressurized air to the container 9. The container 9 accumulates pressurized air at a pressure in the order of 8–12 bars and has a capacity to deliver pressurized air both to the braking system 10 of the vehicle and to the driving means for the centrifugal separator 11 that is adapted for cleaning of crankcase gases coming from the combustion engine 2.

As long as the turbo compressor delivers pressurized air to the drive fluid conduit 5 at a pressure of the magnitude 0.5–2 bars, a corresponding pressure is maintained in the conduit 5a and in the chamber 44 of the valve device 16. This means that the valve member 42 in the valve device 16 is maintained at its right end position with respect to FIG. 6, so that communication between the chamber 43 of the valve device and the passage 45 is prevented. The pressurized air delivered to the driving fluid conduit 5 flows further through the branch conduit 14 to the nozzle 37 (see FIG. 5) and is directed thereby towards the ring of turbine blades 33, so that the centrifugal rotor 19 rotates at a desired speed.

If the vehicle is a car that during some period is going downhill or stands still with its combustion engine going idle, the pressure in the conduits 5, 5a and 14 is substantially reduced, may be to 0.2 bars. Simultaneously the flow of air delivered by the turbo compressor 4 to the driving fluid conduit 5 is substantially reduced. The result will be that the centrifugal rotor can no longer be kept in rotation at a speed that is sufficiently high for an acceptable cleaning of the crankcase gas still leaving the combustion engine through the conduit 12.

In this situation, when the pressure in the chamber 44 of the valve device 16 has been substantially reduced, the valve member 14 is pressed to the left with respect to FIGS. 6 and 7 by the pressure in the chamber 43, which communicates with the auxiliary fluid conduit 15 and, thereby, with the container 9. Then, a connection is opened between the chamber 43 and the passage 45, so that pressurized air from the container 9 may flow further through the valve device 16 and the auxiliary fluid channel 17 to the nozzle 38.

In the nozzle 38 a heavy throttling of the air flow therethrough occurs, so that the driving force on the centrifugal rotor, obtained by the air flow, becomes substantially the same as the driving force which has been generated earlier by the air flow through the nozzles 37, in spite of the fact that the air pressure in the conduit 14 was then substantially lower than the air pressure in the auxiliary fluid channel of the conduit 17.

As soon as the turbo compressor 4 again delivers pressurized air in a sufficient amount and at sufficient pressure for operation of the centrifugal rotor, the valve member 42 automatically returns to its right end position with respect to FIGS. 6 and 7 and the operation of the centrifugal rotor is resumed by means of the pressurized air delivered by the turbo compressor 4.

In the centrifugal rotor 19 the crankcase gases are cleaned from particles suspended therein upon the through flow of the interspaces between the separation discs 25. Said particles are forced by the centrifugal force into contact with the upper sides of the separation discs and are transported after that in contact therewith further by the centrifugal force to the surrounding edges of the separation discs. From there they are thrown towards and against the surrounding wall of the stationary casing 18 and successively leaves the casing through the bottom outlet 32. Cleaned crankcase gases flow through the chamber 30 out of the casing through the outlet 31.

A cleaning device has been described above in which two different nozzles are used for the respective kinds of pressurized air. It is alternatively possible to use only one nozzle of this kind, e.g. the nozzle 37. In this case the conduit 17 may be connected, instead of to the nozzle 38, to the driving fluid conduit 5 downstream of the connection of the branch conduit 5a thereto. Then, however, a special throttling member has to be arranged for throttling of a flow of auxiliary pressurized air from the container 9, before the auxiliary pressurized air arrives at the driving fluid conduit 5. The throttling member may be arranged in some of the conduits 15 and 17 or in the valve device 16.

The invention claimed is:

1. A method of cleaning crankcase gases coming from an internal combustion engine, that is adapted for propelling a means of transportation, the method including the steps of:
   directly injecting into a centrifugal rotor the crankcase gases for cleaning of the crankcase gases,
   driving the centrifugal rotor by means of pressurized air delivered by a compressor and having a pressure of a certain order of magnitude, driving the compressor by means of the combustion engine, and that the centrifugal rotor during periods when said compressor delivers pressurized air in an insufficient amount and/or at insufficient pressure is driven by means of pressurized air, that is coming from a container containing auxiliary pressurized air, the combustion engine being used also for creating the pressure of the auxiliary pressurized air in said container.

2. A method according to claim 1, in which the compressor is driven by means of exhaust gases leaving the combustion engine.

3. A method according to claim 1, in which the air pressure in said container is generated by means of a compressor other than the aforementioned compressor.

4. A method of cleaning crankcase gases coming from an internal combustion engine, that is adapted for propelling a means of transportation, the method including the steps of:

using a centrifugal rotor for cleaning of the crankcase gases, driving the centrifugal rotor by means of pressurized air delivered by a compressor and having a pressure of a certain order of magnitude, driving the compressor by means of the combustion engine, and that the centrifugal rotor during periods when said compressor delivers pressurized air in an insufficient amount and/or at insufficient pressure is driven by means of pressurized air, that is coming from a container containing auxiliary pressurized air, the combustion engine being used also for creating the pressure of the auxiliary pressurized air in said container, and wherein the centrifugal rotor is driven by means of a gas turbine.

5. A method according to claim 4, in which the pressurized air from the compressor is caused to flow through a stationary nozzle towards a ring of turbine blades, which are drivingly connected with the centrifugal rotor.

6. A method according to claim 4, in which the pressurized air from said container is caused to flow through a stationary nozzle towards a ring of turbine blades, which are drivingly connected with the centrifugal rotor.

7. A method according to claim 4, in which an air pressure is generated in said container, which is larger than the pressure of the pressurized air delivered from the compressor.

8. A method according to claim 7, in which the pressurized air from said container is caused to flow through another nozzle than the nozzle intended for the pressurized air coming from the compressor.

9. A method according to claim 7, in which the flow of pressurized air from said container is throttled, so that this pressurized air gets substantially the same driving force on the centrifugal rotor as the pressurized air from the compressor had before the use of pressurized air from the container.

10. A method according to claim 7, in which the pressurized air from said container is caused to flow through the same nozzle as the pressurized air from the compressor, the flow of pressurized air from the container being throttled before the pressurized air arrives at said nozzle.

11. A device for cleaning of crankcase gases coming from an internal combustion engine, including a centrifugal rotor that is rotatable about a rotational axis and adapted for cleaning of a flow of said crankcase gases, a ring of turbine blades adapted to be drivably connected with the centrifugal rotor and a stationary driving fluid nozzle adapted to receive from a driving fluid conduit pressurized air having a pressure of a certain order of magnitude and to direct a flow of pressurized air towards the ring of turbine blades for rotation of the centrifugal rotor, a valve means is connectable to an auxiliary fluid conduit, that is adapted to receive auxiliary pressurized air, that the valve means forming or being connectable to an auxiliary fluid channel, that is adapted to communicate with one of said driving fluid nozzles and an auxiliary fluid nozzle, which like the driving fluid nozzle is adapted to direct a flow of auxiliary pressurized air towards the ring of turbine blades for rotation of the centrifugal rotor, and wherein that the valve means is adapted to prevent or admit that auxiliary pressurized air is conducted from the auxiliary fluid conduit to the auxiliary fluid channel.

12. A device according to claim 11, in which the auxiliary fluid conduit is adapted to receive auxiliary pressurized fluid having a pressure larger than said pressure of a certain order of magnitude, and a throttling member other than said driving fluid nozzle is adapted to throttle a flow of auxiliary pressurized air, when auxiliary pressurized air is admitted to flow through the valve means.

13. A device according to claim 11, in which the auxiliary fluid channel communicates with said auxiliary fluid nozzle and a driving fluid channel, which is separated from the auxiliary fluid channel, communicates with the driving fluid nozzle.

14. A device according to claim 12, in which the auxiliary fluid nozzle forms said throttling member.

15. A device according to claim 14, in which the auxiliary fluid nozzle is a De Laval-nozzle.

16. A device according to claim 11, in which the valve means includes a valve member movable between two positions, the valve member being adapted in a first position to prevent and in a second position to admit that auxiliary pressurized air is conducted from the auxiliary fluid conduit to the auxiliary fluid channel, the valve member is adapted, for taking said first position, to be actuated by an air pressure prevailing in said drive fluid conduit and, for taking said second position, to be actuated by an air pressure prevailing in said auxiliary fluid conduit, and the valve member has a first pressure surface exposed to the pressure in said driving fluid conduit and a second pressure surface exposed to the pressure in said auxiliary fluid conduit, said first pressure surface being larger than said second pressure surface.

* * * * *